United States Patent Office 3,229,638
Patented Jan. 18, 1966

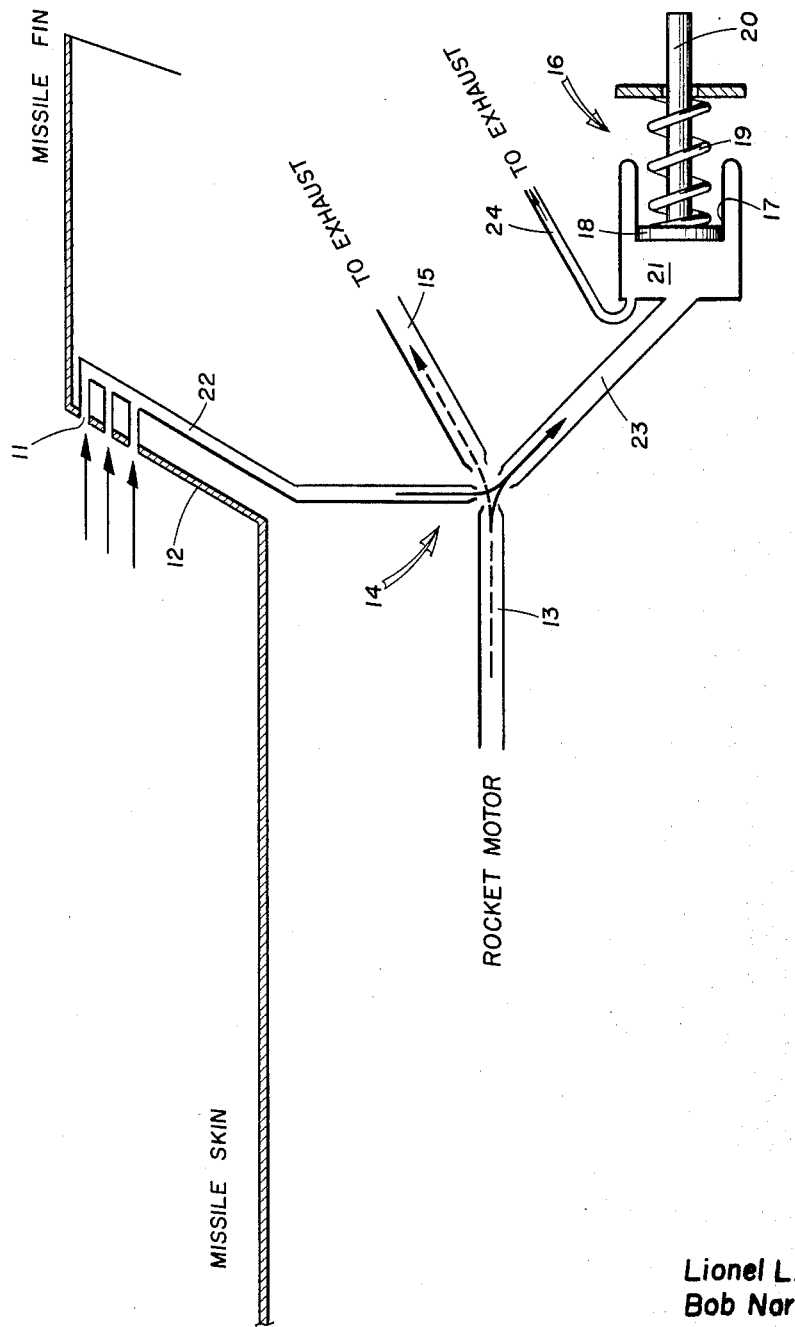

3,229,638
AIR-LAUNCH ENVIRONMENTAL SAFING DEVICE
Lionel L. Woolston and Bob Norris, Silver Spring, Md., assignors to the United States of America as represented by the Secretary of the Navy
Filed July 31, 1964, Ser. No. 386,803
7 Claims. (Cl. 102—49)
(Granted under Title 35, U.S. Code (1952), sec. 266)

The invention described herein may be manufactured and used by or for the Government of the United States of America for governmental purposes without the payment of any royalties thereon or therefor.

This invention relates to a safety and arming mechanism for a rocket-powered missile and more particularly to a safety device for a rocket-propelled missile launched from an aircraft for preventing arming of the warhead unless the missile is both under propulsion and in flight.

A fundamental requirement of fuzes for all types of missiles is for the provision therein of a safety mechanism capable of preventing premature ignition of the explosive mechanism. This requirement has led to the discovery of a number of expedients. One of these is to use an inertia means responsive to missile acceleration, frequently referred to as "setback" to insure that the fuze will not be armed until the missile reaches a predetermined acceleration. Another prior art expedient in rocket-powered projectiles is to utilize the gas pressure created in the normal operation of the rocket motor for arming the fuze.

Although these safety expedients have generally served the purpose, they have not proved entirely satisfactory under all conditions of service. For example, the accelerometer approach is not good for a low $g$ safety and arming device as it would require being too much like a delicate, temperamental instrument. The rocket-pressure switch approach is generally adequate in missiles of this type, but the rocket-pressure devices hereintofore used had no provision for distinguishing between a real, intended launch from a moving launch-aircraft and an accidental ignition of the rocket motor on the ground. Therefore, another design requirement for the safety mechanisms in fuzes of the type described for use in air-launched, low $g$ rockets is to provide therein additional safety means in the arming function capable of discriminating between in-flight drops and accidental ignition of the rocket on the ground.

According to the present invention all of these requirements are met by preventing arming of the missile fuze until the missile is in flight as well as being under propulsion. Although the safety and arming mechanism of the present invention is designed to be released by the pressure of the gases produced by the combustion of the rocket propellant, as accomplished in some of the prior art devices, this pressure developed by the rocket motor does not contact the arming mechanism in the present device unless directed thereto by dynamic pressure caused by the forward, in-flight movement of the missile.

Therefore, it is an object of the present invention to provide a safety and arming mechanism for rocket fuzes on air-launched missiles that is operable by rocket motor gas pressure, and which will not become armed unless the missile is in flight.

Another object is to provide such a mechanism wherein the arming means for the fuze is responsive to the rocket motor gas pressure and the dynamic pressure caused by forward, in-flight movement of the missile.

A further object is to provide a safety and arming mechanism for air-launched missiles wherein the arming means are operable only when the missile is in flight.

Still another object is to provide such a mechanism for air-launched, rocket-powered missiles wherein means are provided for distinguishing between real air launches and accidental rocket ignition on the ground.

A still further object is to provide a safety and arming mechanism for air-launched, rocket-powered missiles wherein pure fluid amplification means are utilized for performing the arming function.

Other objects, advantages and novel features of the invention will be readily appreciated as the same becomes better understood by reference to the following detailed description when considered in connection with the accompanying drawing wherein the solitary figure is a schematic diagram of an air-launch environmental safety and arming mechanism embodying the principles of the present invention.

As observed in the drawing, multiple ports 11 are provided in a projecting part of the missile, such as the leading edge 12 of a missile fin, for the purpose of receiving ram air pressure when the missile is in flight. A plurality of ports are used so that, in the event of some becoming obstructed, an ample amount of ram air pressure would still be received for carrying out the intended function, hereinafter to be fully described.

Within the missile structure there is shown a duct 13 leading from the rocket motor to a pure fluid valve generally designated by the reference numeral 14 for carrying high pressure gases generated by the combustion of rocket propellants from the rocket motor to the valve 14, and normally therethrough to duct 15 and exhaust as indicated by the dotted arrow in the drawing. The gases from the rocket motor are filtered upstream of the valve 14 for the purpose of preventing clogging.

Also positioned within the missile is a locking assembly for the safety and arming mechanism generally indicated by the numeral 16 and comprising the bellows-type diaphragm 17, a piston 18 engaging the expandable portion of the diaphragm, and a coil spring 19 urging the piston head in a forward direction. Piston rod 20 is attached to a control member (not shown) in such a manner that movement of the rod in the aft direction will cause the control member to release and start the arming timer and unlock a safing device in the safety and arming mechanism. In order to prevent arming of the weapon due to momentary movement such as might be caused, for example, by shock, it is necessary that the piston rod 20 be maintained in the aft direction a sufficient period of time to allow the timer to complete its cycle before arming can be accomplished. This means that a sustained force sufficient to overcome the loading of spring 19 must be applied in the piston chamber 21 to piston head 18 in order to release the safety and arm the weapon.

Referring again to the pure fluid valve 14 it will be seen that a duct 22 leads into one side of the valve from the ports 11 in the leading edge of the missile fin, and that a duct 23 leads from the opposite side of the valve 14 to the piston chamber 21. In accordance with this arrangement, as illustrated in the drawing, it is readily apparent that the exhaust duct 15 may be referred to as an "upper leg" of the pure fluid element, and the duct 23 as a "lower leg" thereof.

Thus, if the rocket were accidentally ignited on the ground, the high-pressure gases from the combustion would flow from the rocket motor through duct 13, and through the valve 14 to the "upper leg," or exhaust duct 15, exiting therefrom, doing nothing to affect the locking assembly 16 and therefore rendering safety in the safety and arming mechanism of the missile.

On the other hand, if the missile is launched properly from an aircraft in flight at the proper speed, low ram air pressure received at the leading edge 12 of the missile fin, which itself would be insufficient to overcome the bias of spring 19, is directed from ports 11 and through duct 22 to the pure fluid element 14 where it acts as a pneumatic trigger or control grid, deflecting the high-pressure rocket gas toward the "lower leg," or duct 23, of the element, as indicated by the solid arrow in the drawing emanating from two sources, thereby causing the rocket gas to flow into piston chamber 21 wherein, because of its high pressure, it is able to force piston 18 and rod 20 in the aft direction to actuate the release for the safety and arming mechanism. Used in the manner described, it may be seen that the pure fluid valve element 14 acts as an amplifier, multiplying by many times the dynamic pressure of flight by using the high-pressure rocket gas to operate the safety release.

Further shown in the drawing is a small exhaust duct 24 in the piston chamber 21 provided therein to keep from choking the flow.

It should be readily apparent therefore that the present invention provides a safing device for use in air-launched, high or low g, rocket-powered missile which prevents the missile warhead from being armed until both rocket ignition and forward, in-flight movement of the missile occurs, thus insuring against accidental damage in the event of premature ignition of the rocket on the ground. The device is operated by the presence of rocket motor pressure but relies on a means for circumventing application of the rocket gas until dynamic pressure from flight is also present.

Obviously many modifications and variations of the present invention are possible in the light of the above teachings. It is therefore to be understood that within the scope of the appended claims the invention may be practiced otherwise than as specifically described.

What is claimed is:

1. A safety and arming mechanism for a missile employing a rocket motor generating a high-pressure gas comprising:
   gas-operated means for releasably engaging an arming timer for a fuze mechanism in the missile,
   a pure fluid valve means having a pair of inlets and a pair of outlets,
   duct means for conveying gas from the rocket motor to one of said inlets in said valve means,
   said one of said inlets and one of said outlets in said valve means being aligned and defining the normal flow path for the high pressure gas generated by said rocket motor,
   a projecting missile part having at least one port therein for receiving ram air pressure when the missile is in flight,
   duct means connecting said port to the other of said inlets in said valve means for conveying dynamic air pressure therebetween,
   and duct means connecting the other of said outlets in said valve means to the means engaging said arming timer so positioned in said valve means to receive the high pressure rocket gas when it is deflected from its normal flow path by the dynamic pressure of flight,
   whereby when the missile is under propulsion and in flight the high-pressure rocket gas will be deflected from a normal flow path to exhaust to a flow path to said gas-operated means for releasing said arming timer and allowing the weapon to become armed.

2. The mechanism of claim 1 wherein said gas-operated means comprises an expandable chamber,
   an arming control-engaging piston in surface engagement with one wall of said expandable chamber,
   and a biasing element normally urging said piston against said wall of said expandable chamber for maintaining the mechanism in the unarmed condition.

3. The mechanism of claim 1 wherein said projecting missile part is provided with a plurality of ports for receiving ram air pressure when the missile is in flight, and all of said ports are in fluid communication with said other of said inlets in said valve means via said dynamic air pressure conveying duct means.

4. The mechanism of claim 2 wherein said expandable chamber is provided with a small exhaust port to prevent choking of the air flow.

5. The mechanism of claim 1 wherein said duct means between said rocket motor and said valve means is provided with means for filtering said rocket gas.

6. A safing device for safety and arming mechanism in a missile employing a rocket motor generating a high-pressure gas comprising:
   gas-operated means for releasably engaging said safety and arming mechanism in the missile and normally locking said mechanism in a safe condition,
   a pure fluid valve means,
   means providing fluid communication from said rocket motor through said valve means and to atmosphere, defining the normal flow path for said high-pressure rocket gas,
   means for receiving ram air pressure when the missile is in flight,
   means providing fluid communication between said receiving means and said valve means at the point of reception of said rocket gas in said valve means,
   and means providing fluid communication between said valve means and said gas-operated releasing means at a point in said valve means substantially opposite the side of said normal flow path from which ram air is received, thereby providing an alternate flow path for said rocket gas to said gas-operated releasing means,
   whereby when the missile is both under propulsion and in flight, the high-pressure rocket gas is deflected from a normal to an alternate flow path by the dynamic pressure of flight to effect release of said safety and arming mechanism, and to arm the missile.

7. In a safety and arming mechanism for a missile employing a rocket motor generating a high-pressure gas, the improvement comprising means for preventing arming of the missile warhead unless the rocket is both under propulsion and in flight, said means including:
   a gas-operated locking assembly releasably engaging an arming timer in said safety and arming mechanism,
   means for receiving said high-pressure rocket gas when the rocket motor has been ignited and for directing the flow of said gas to the atmosphere,
   means for receiving ram air pressure when the missile is in flight,
   and pure fluid amplification means connected with said ram air and rocket gas receiving means and using said ram air to deflect the flow of said high-pressure rocket gas to said gas-operated locking assembly for releasing said assembly and starting the arming timer.

References Cited by the Examiner

UNITED STATES PATENTS

| | | | |
|---|---|---|---|
| 2,872,869 | 2/1959 | Rasmussen | 102—81 |
| 2,918,870 | 12/1959 | Meister | 102—49 |
| 2,926,609 | 3/1960 | Van Goey et al. | 102—81 X |
| 3,066,605 | 12/1962 | Jones | 102—81 X |

BENJAMIN A. BORCHELT, *Primary Examiner.*

V. R. PENDEGRASS, *Assistant Examiner.*